Nov. 5, 1957 — A. W. GAUBATZ — 2,811,871
ADJUSTABLE CAM
Filed Aug. 19, 1954 — 2 Sheets-Sheet 1
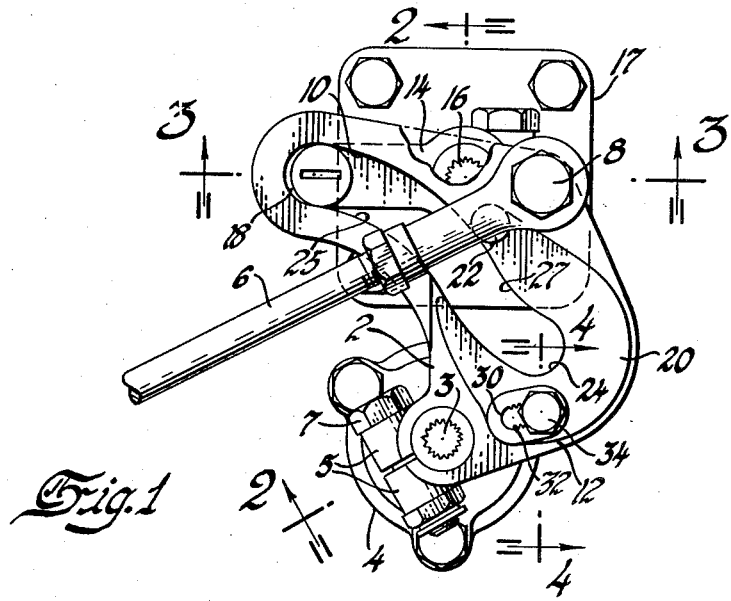
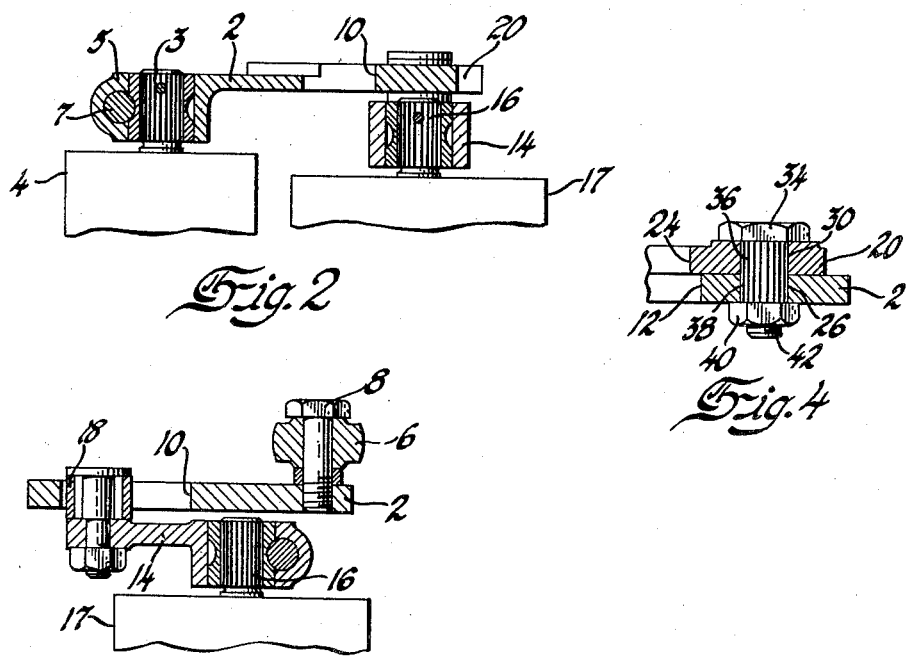
INVENTOR
Arthur W. Gaubatz
BY Paul Fitzpatrick
ATTORNEY

United States Patent Office 2,811,871
Patented Nov. 5, 1957

2,811,871

ADJUSTABLE CAM

Arthur W. Gaubatz, Indianapolis, Ind., assignor to General Motors Corporation, Detroit, Mich., a corporation of Delaware Application August 19, 1954, Serial No. 450,946

8 Claims. (Cl. 74—568)

This invention relates to an adjustable cam and more particularly to an adjustable cam track formed by portions of the cam track in each of two members which are pivotally secured together and adjustable with respect to each other.

This cam track is formed by a main cam plate having one portion of a continuous cam track and a secondary cam plate having the other portion of the continuous cam track. The secondary cam plate is pivotally secured to the main cam plate and locking mechanism is provided to hold the secondary cam plate in any position to which it is moved relative to the main cam plate. The cam track is continuous in all positions of the secondary cam plate.

This continuous cam track has found particular use in adjustable governor controls for aircraft engines. Each engine has different operating characteristics and, therefore, each governor must be pre-set to different control schedules. The cam track is operatively connected to the fuel control valve and is positioned by the throttle linkage. A cam roller slides in the cam track and is operatively connected to the governor for pre-setting the governor in accordance with throttle position. Since the cam track is adjustable, the governor can be easily pre-set in accordance with the operating characteristics of the individual engine.

Upon consideration of the specific use disclosed for this variable cam it is evident that there are other uses wherein it will perform similar functions.

An object of this invention is to provide an adjustable cam track formed by portions of the track in each of two members which are pivotally secured together and adjustable with respect to each other. Another object of this invention is to provide an adjustable cam track formed by a main cam plate having a portion of a continuous cam track and a secondary cam plate pivotally secured to the main cam plate and having the other portion of the continuous cam track, with the secondary cam plate being adjustable to various positions with respect to the main cam plate. A further object of this invention is to provide an adjustable cam track formed by a main cam plate having a cam track with a terminal portion of the track being of enlarged width and a secondary cam plate pivotally secured to the main cam plate and having a continuation cam track adjustably positioned over the portion of enlarged width to form a continuous cam track, with a serated locking pin cooperating with mating serrations of each of the cam plates to lock the secondary cam plate in any adjustable position. Yet another object of this invention is to provide an adjustable governor mechanism for pre-setting a governor in accordance with the operating characteristics of an engine and including an adjustable cam track formed by portions of the track in each of two members which are pivotally secured together and adjustable with respect to each other.

These and other objects of this invention will be readily apparent from the following specification and drawings in which:

Figure 1 is a view of the adjustable cam combined with a governor control for aircraft engines;

Figure 2 is a view on the plane indicated by line 2—2 of Figure 1;

Figure 3 is a view on the plane indicated by line 3—3 of Figure 1;

Figure 4 is a view on the plane indicated by line 4—4 of Figure 1 and showing the locking mechanism;

Figure 5:
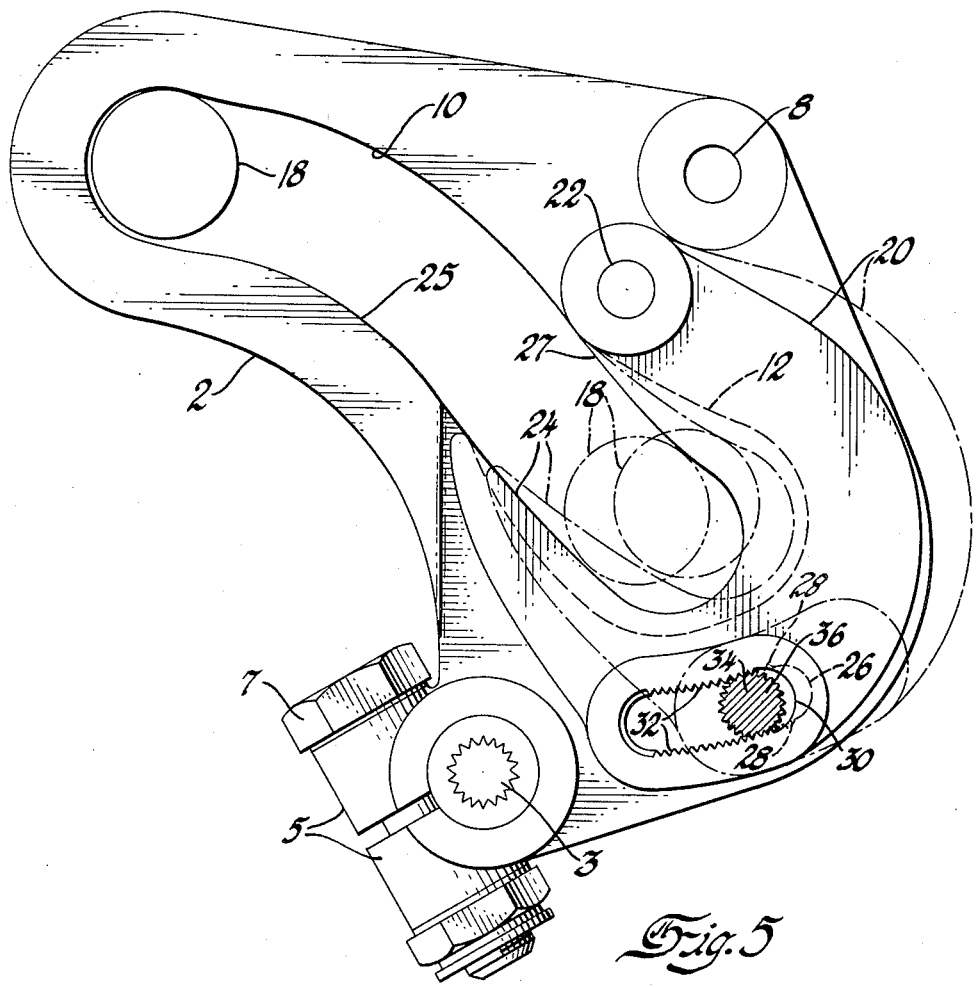
Figure 5 is an enlarged view of the adjustable cam.

Referring now to the drawings, a main cam plate 2 fits over the splined end 3 of a fuel cut-off valve 4 and is secured thereto by cylindrical bosses 5 and nut and bolt 7. A link 6, which is part of a conventional throttle linkage, is pivotally connected to the main cam plate at 8. The throttle linkage is manually operable and controls the flow of fuel to the engine by controlling the position of the main cam plate. An arcuate continuous cam track 10 is formed in the main cam plate and the terminal portion 12 (Figure 5) of this cam track has a width greater than the normal width of the cam track as can be seen in the drawings.

A lever 14 is attached to shaft 16 of governor 17 by a splined connection and the other end of lever 14 is provided with a cam roller 18 which operates in the arcuate cam track 10. It can be seen that the width of the cam track is substantially equal to the diameter of the cam roller, except for the lower terminal portion 12 of the cam track which is enlarged as hereinbefore described.

A U-shaped secondary cam plate 20 is pivotally mounted on the main cam plate at 22 adjacent the cam track 10. The pivotal mounting 22 of the secondary plate is at the point where the enlarged portion 12 of the cam track 10 starts in order that the continuation cam track 24 formed by the legs of the secondary cam plate will form a continuous cam track with cam track 10. The secondary cam plate 20 is adjustable about pivot 22 to various positions, with two positions being shown in the drawings (Figure 5) together with two positions of cam roller 18 at this terminal end of the continuous cam track.

Cam track 10 and continuation cam track 24 form a continuous cam track 25 and the terminal portion 27 of this cam track can be adjusted to various positions by moving the secondary cam plate 20 about pivot 22.

In order that the secondary cam plate may be secured to the main cam plate in any adjustable position of the secondary cam plate, a locking mechanism is provided as will now be described. The main cam plate 2 is provided with an arcuate slot 26 which has serrations 28 on either side of the slot. The secondary cam plate 20 is provided with a similar arcuate slot 30 which has serrations 32 on either side of the slot. The arcuate slots in each plate are formed on an arc about pivot 22 and certain serrations in each slot may be aligned in any adjustable position of secondary cam plate 20. A serrated locking pin 34 having a shank 36 provided with serrations 38 passes through slots 26 and 30. Serrations 38 fit between aligned serrations in each of the arcuate slots and thereby hold the secondary cam plate in any of its adjustable positions. A nut 40 fits on a reduced shank portion 42 of the locking pin 34, to further hold the pin in place.

When it is desired to move the secondary cam plate in order to change the terminal portion 27 of continuous cam track 25, the locking pin 34 is removed from the arcuate slots and the secondary cam plate moved to its new position. Then certain of the serrations 32 of arcuate slot 30 will be aligned with certain of the serrations 28 of arcuate slot 26 and the locking pin 34 can be fitted in place again to hold the secondary cam plate in its new position.

While a specific embodiment of this invention has been shown and described, various changes and modifications may be made within the scope and spirit of the invention without departing from it.

I claim:

1. An adjustable cam comprising a first member having a cam track therein with a portion of said track being of enlarged width, a second member pivotally secured to said first member and having a continuation cam track adjustably positioned over said portion of enlarged width to form a single continuous cam track with said first-mentioned cam track, and means for locking said continuation cam track in any adjustable position thereof.

2. An adjustable cam comprising a first member having a cam track therein with a terminal portion of said track being of enlarged width, a second member pivotally secured to said first member and having a continuation cam track adjustably positioned over said terminal portion of enlarged width to form a single continuous cam track with said first-mentioned cam track, and means for locking said continuation cam track in any adjustable position thereof.

3. An adjustable cam comprising a first plate having a closed cam track therein with a terminal portion of said track having a width greater than the normal width of said track, a second plate pivotally secured to said first plate and having a continuation cam track fitting over said terminal portion of enlarged width, said continuation cam track being of normal width and having an open terminal portion forming a single continuous cam track with said first-mentioned cam track, and means for locking said continuation cam track in any adjustable position thereof.

4. An adjustable cam comprising a first plate having a cam track therein with a portion of said track being of enlarged width, a U-shaped second plate pivotally secured at one leg thereof to said first plate adjacent said cam track, said second plate being adjustably positioned over said portion of enlarged width with the legs of said second plate forming a single continuous cam track with said first-mentioned cam track, and means for locking said second plate in any adjustable position thereof.

5. An adjustable cam comprising a first plate having a closed cam track therein with a terminal portion of said track having a width greater than the normal width of said track, a second plate having two legs defining a continuation cam track of normal width, said second plate being pivotally secured at one leg thereof to said first plate adjacent said cam track and being adjustably positioned over said terminal portion whereby said continuation cam track forms a single continuous cam track with said first-mentioned cam track, and means for locking said continuation cam track in any adjustable position thereof.

6. An adjustable cam comprising a first member having a cam track therein with a portion of said track being of enlarged width, a second member pivotally secured to said first member and having a continuation cam track adjustably positioned over said portion of enlarged width to form a single continuous cam track with said first-mentioned cam track, and means for locking said continuation cam track in any adjustable position thereof, said means including arcuate slots in each of said members and a locking member extending through said slots.

7. An adjustable cam comprising a first member having a cam track therein with a portion of said track being of enlarged width, a second member pivotally secured to said first member and having a continuation cam track adjustably positioned over said portion of enlarged width to form a single continuous cam track with said first-mentioned cam track, and means for locking said continuation cam track in any adjustable position thereof, said means including arcuate serrated slots in each of said members and a locking pin cooperating with said serrations.

8. An adjustable cam comprising a first member having a cam track therein with a portion of said track being of enlarged width, a second member pivotally secured to said first member and having a continuation cam track adjustably positioned over said portion of enlarged width to form a single continuous cam track with said first-mentioned cam track, and means for locking said continuation cam track in any adjustable position thereof, said means including arcuate serrated slots in each of said members and a serrated locking pin extending between mating serrations in each of said members.

References Cited in the file of this patent

UNITED STATES PATENTS

| | | |
|---|---|---|
| 143,235 | Goodwin | Sept. 30, 1873 |
| 868,086 | Hanson et al. | Oct. 15, 1907 |
| 1,041,303 | Knudsen | Oct. 15, 1912 |
| 2,107,079 | Mentele | Feb. 1, 1938 |
| 2,184,752 | O'Brien | Dec. 26, 1939 |
| 2,454,914 | De Marco | Nov. 30, 1948 |
| 2,495,503 | Beatrice | Jan. 24, 1950 |